July 14, 1959

J. O. McMILLAN 2,894,604

RESTAURANT EQUIPMENT

Filed March 16, 1956

INVENTOR.
J. O. McMILLAN

BY *Jahn H. Widdowson*

ATTORNEY

July 14, 1959     J. O. McMILLAN     2,894,604
RESTAURANT EQUIPMENT

Filed March 16, 1956     7 Sheets-Sheet 3

INVENTOR.
J. O. McMILLAN
BY
*John H. Widdowson*
ATTORNEY

July 14, 1959     J. O. McMILLAN     2,894,604
RESTAURANT EQUIPMENT
Filed March 16, 1956     7 Sheets-Sheet 6
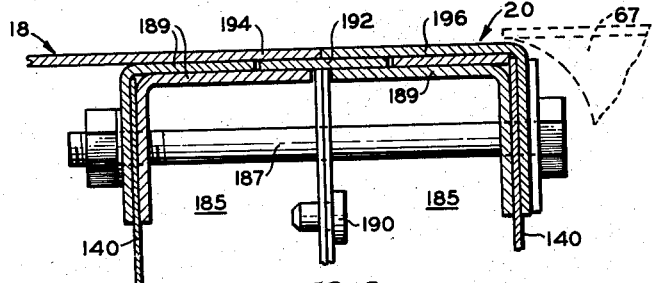
FIG. 6.
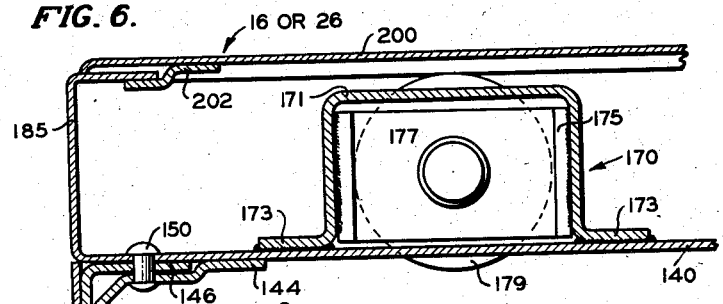
FIG. 7.
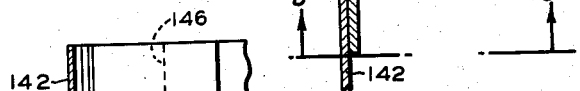
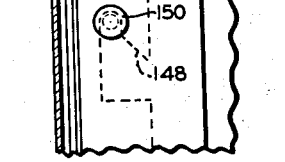
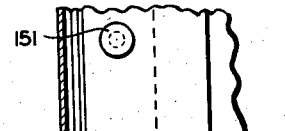
FIG. 8.
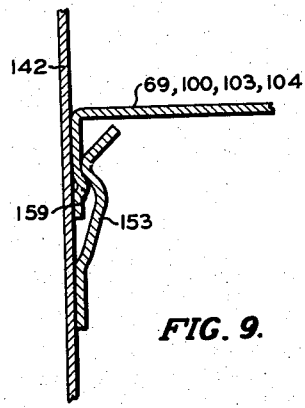
FIG. 9.
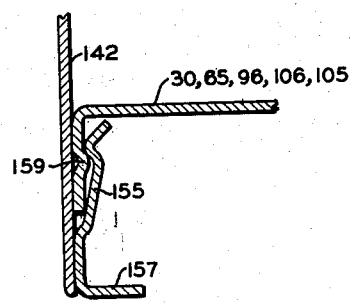
FIG. 10.
INVENTOR.
J. O. McMILLAN
BY
*John N. Widdowson*
ATTORNEY

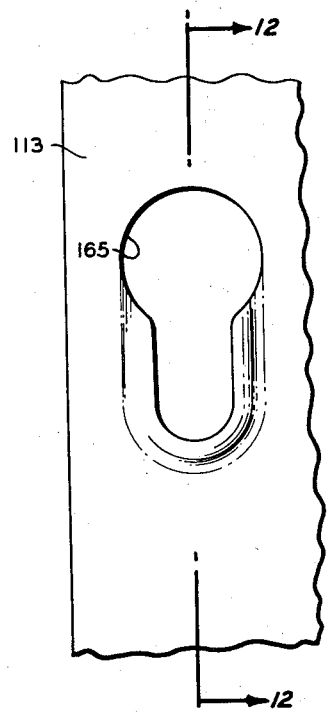
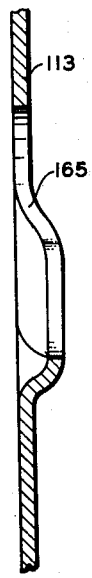
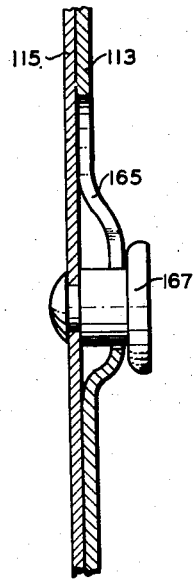
FIG. 11.   FIG. 12.   FIG. 13.
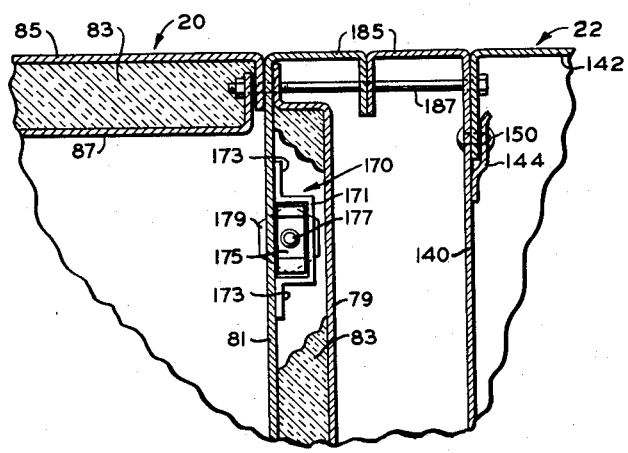
FIG. 14.

United States Patent Office 2,894,604
Patented July 14, 1959

2,894,604

RESTAURANT EQUIPMENT

James O. McMillan, Wichita, Kans., assignor to Frank J. Ablah, Wichita, Kans.

Application March 16, 1956, Serial No. 572,041

4 Claims. (Cl. 186—1)

This invention relates to the serving of food. In a more specific aspect, this invention relates to restaurant equipment. In a still more specific aspect, this invention relates to restaurant equipment for the self-service of diners. In yet a more specific aspect, this invention relates to knock-down restaurant equipment, particularly back bar and cabinet structure, such being found desirably used in construction the new self-service restaurant equipment of my invention.

Restaurants and equipment therefor have long been known in the art, some of such equipment being used to display prepared and cooked food to the diners. The cafeteria type eating place displays its different types of food so that the diner may choose the particular type of food he or she desires. The ordinary type restaurant wherein waiters or waitresses serve the diner are slow in serving, very inefficient and expensive to operate, requiring a great amount of personnel, high cost labor, and the diner is always limited to the kind and quantity of food being served as decided by the management, unless expensive time and effort is expended in changing from the menu of the day and personally instructing the chef and persons placing the servings on the plates, bowls, other dishes, etc. The cafeteria is an improvement over the waiter and/or waitress type restaurant operation in regard to speed of serving, efficiency and cost of operation. However, it still requires a lot of costly labor to serve the diner after he has made his selection, and the cafeteria type operation is inefficient when the diner wants more or less than the usual portion served, delay in the cafeteria lines being occasioned due to explanation to the food server by the patron diner in regard to quantity of food, amount of dressing or condiment, etc.

I have invented restaurant equipment for the self-service of diners which reduces operating costs to a minimum, particularly in the amount of labor and food required to feed a given number of diners, provides for the service of a maximum number of persons for a given size of restaurant and period of time, and which is a very efficient operation from the standpoint of food handling and patron handling. The new self-serving equipment of my invention has an elongated cabinet structure having means therewith to display food for the self-service of diners. The cabinet structure has serving tray support means mounted in close relation thereto on each side. This serving tray support means supports the serving tray of diners as they move along the cabinet structure selecting the food they desire to eat. One of the principal features of the new restaurant equipment of my invention is that the cabinet is so constructed that persons can serve themselves from either side thereof as they pass along. In a preferred specific embodiment of the new restaurant equipment of my invention unique socalled sneeze guards are provided to cooperate with the cabinet structure to shield the food from germ contamination as a result of coughing and sneezing by the patron diner, and the serving tray support means is cooperatively mounted on and in relation to the cabinet structure to prevent unsightly and unsanitary dripping of food by the patron and so that the serving tray bottoms are suspended in air to prevent soiling the bottom of a tray in use, so that it will not in turn soil the top of another tray when such are stacked.

In the construction of the cabinet structure of my invention for providing the self-serving restaurant equipment of my invention, I prefer to use new knock-down cabinet and back bar structure of my invention. Of course, such cabinet structure can be used for other purposes in restaurants, homes, offices, industrial plants, and the like. This new cabinet structure of my invention has a side or back member, depending on whether the cabinet sits against a wall or out in the open, and two end members. The end members are engaged with the side or back members by cooperating tongue and groove means. The tongue portion of the connecting means has fastener slots therein, and the groove portion of the connecting means has fastener pin means therein. The pins fit in the slots to hold the end and side or back members in proper relation with one another. The side or back and end members have shelf bracket means mounted thereon. Shelf means are used which has portions engageable with the shelf bracket means and when engaged the shelves are in proper position holding the side or back and end members together. The new knock-down cabinet or back bar structure of my invention is very versatile, being readily adapted to any type of top structure, for example, shelf superstructure, warm food trays and heating equipment therefor, water or coffee dispensing equipment, etc., and any type of lower structure, for example, an open storage cabinet or one with sliding doors. The new structure is easily assembled with the use of a minimum number of tools, requiring only a screwdriver and a pair of pliers for an assembly such as the new self-service cabinet structure of my invention. The cabinet structure knocks down to a compact bundle which is easy and inexpensive to ship.

It is an object of this invention to provide new means to serve food.

It is another object of this invention to provide new restaurant equipment.

Yet another object of this invention is to provide new restaurant equipment for the self-service of patron diners.

Still another object of this invention is to provide new knock-down restaurant equipment, particularly back bar and cabinet structure.

And a further object of my invention is to provide means for the service of patron diners in a restaurant which can be used to serve a maximum number of same in a minimum amount of time with optimum efficiency and minimum cost.

Other objects and advantages of my invention will become apparent to those skilled in the art upon reading this disclosure.

Drawings accompany and are a part of this disclosure. The drawings depict preferred specific embodiments of the new structure of my invention, and it is to be understood that such are not to unduly limit the scope of my invention.

In the drawings, Fig. 1 is a perspective view of the restaurant equipment of my invention which is used to self-serve patron diners.

Fig. 6 is an enlarged illustrative view taken on line

Figure 4:
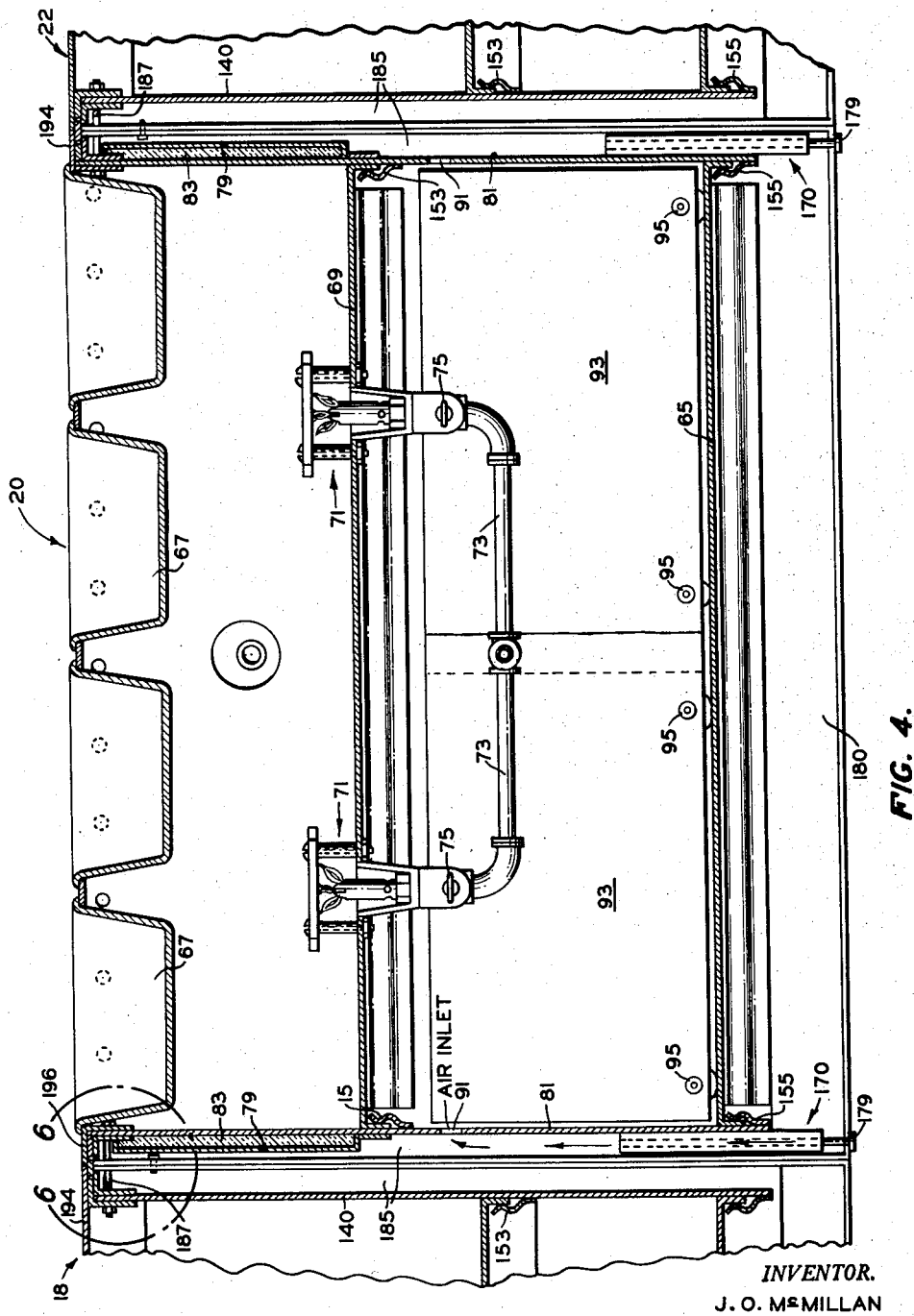
Fig. 4 is an enlarged longitudinal cross sectional elevation view through the warm food section of same.

6—6 of Fig. 4 to show in detail my preferred means of joining together adjacent units of my cabinet structure to provide for a smooth, even top surface.

Fig. 7 is an enlarged illustrative cross sectional view to show in detail my preferred slip-on joining means, and adjustable leg and foot mounting means for the new knock-down back bar or cabinet structure of my invention.

Fig. 8 is an elevation view taken on line 8—8 of Fig. 7.

Fig. 9 is an enlarged cross sectional view showing preferred middle shelf mounting bracket means for the new knock-down back bar or cabinet structure of my invention.

Fig. 10 is an enlarged cross sectional view showing my preferred wedge type key hole fastening and mounting means.

Fig. 11 is an enlarged elevation view showing the key hole portion of my preferred wedge type key hole fastening and mounting means.

Fig. 12 is a view of same taken on line 12—12 of Fig. 11.

Fig. 13 is an assembled view in cross section of the wedge type key hole fastening means showing the rivet type key in place.

Fig. 14 is an enlarged illustrative cross sectional view showing in detail preferred means of joining together adjacent unit cabinet structures, in this instance, the warm food section to the pastry and storage section.

Following is a discussion and description of the new self-service restaurant equipment and knock-down back bar or cabinet structure of my invention. The discussion and description is made with reference to the drawings whereon the same reference numerals are used to identify the same or similar parts or structure. The discussion and description is of preferred specific embodiments of my invention, and it is to be understood that such is not to unduly limit the scope of my invention.

The preferred specific embodiment of the self-service restaurant equipment of my invention depicted in the drawings has six units, namely, a tray and dish section 16, a refrigerated dessert and salad station 18, a warm food section 20, a pastry station 22, a coffee station 24, and a water and checkout station 26.

The tray and dish station 16 in use holds the serving trays 28 which are used by the patron diners to hold the food they select from that displayed. These trays are best stacked on top of the unit. This station 16 preferably has storage space in its lower portion, and a bottom or shelf 30 on which are stacked dishes which the patrons place on the trays 28 during their self-service. This station 16 can and in many cases preferably has therewith a "Lowerator" which is a balanced device designed to keep the top dish, for example, a dinner plate, of a stack of same always at the same level, in this case at approximately the level of the top of station 16. When a plate is removed from the stack, the "Lowerator" delivers the next one to the top level of station 16. The position of the "Lowerator" is shown approximately by dotted lines numbered 31 in Fig. 2, and an opening 32 therefore is provided in the top 34 of station 16. Station or unit 16 is the first station at which the patron diner pauses where he gets his tray and dishes to serve himself.

Figure 1:
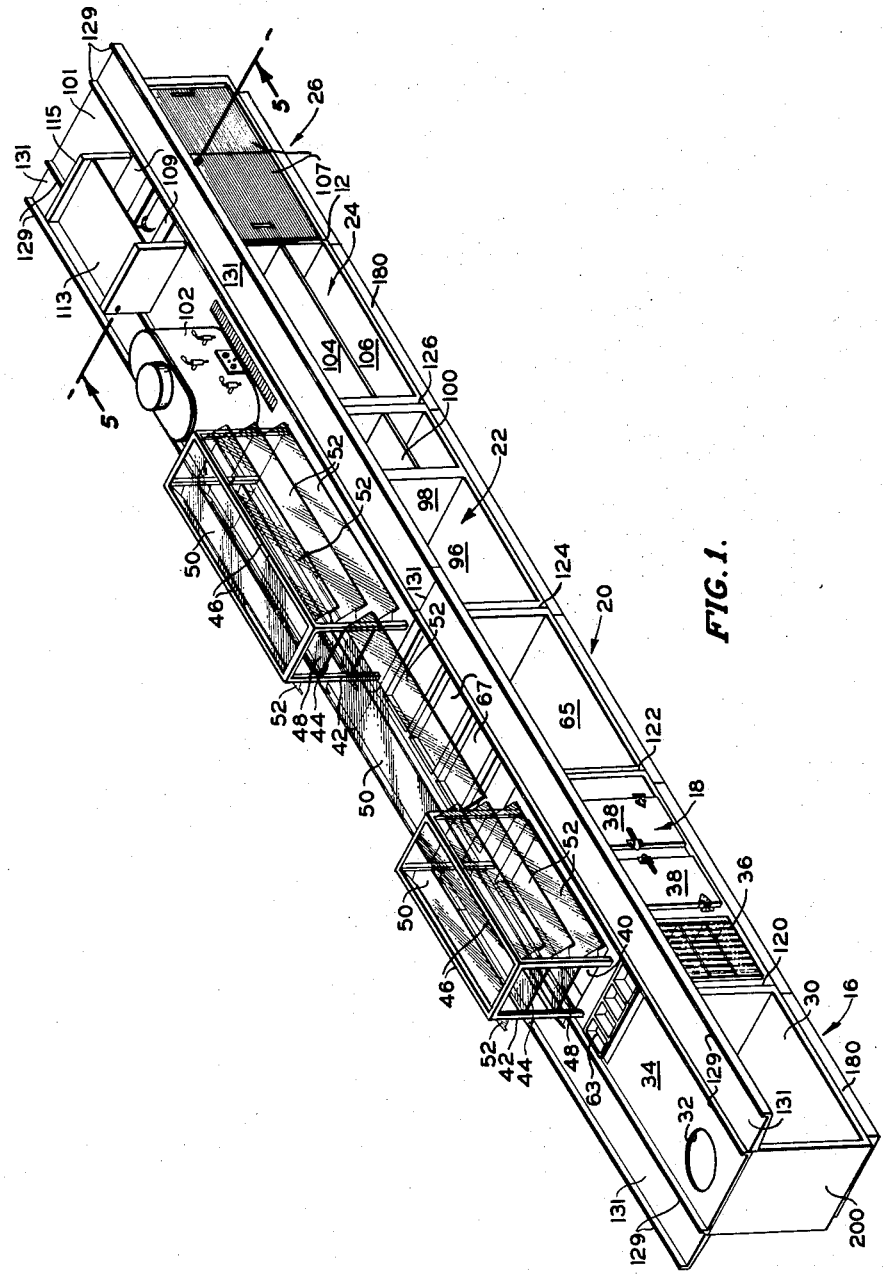
Figure 2:
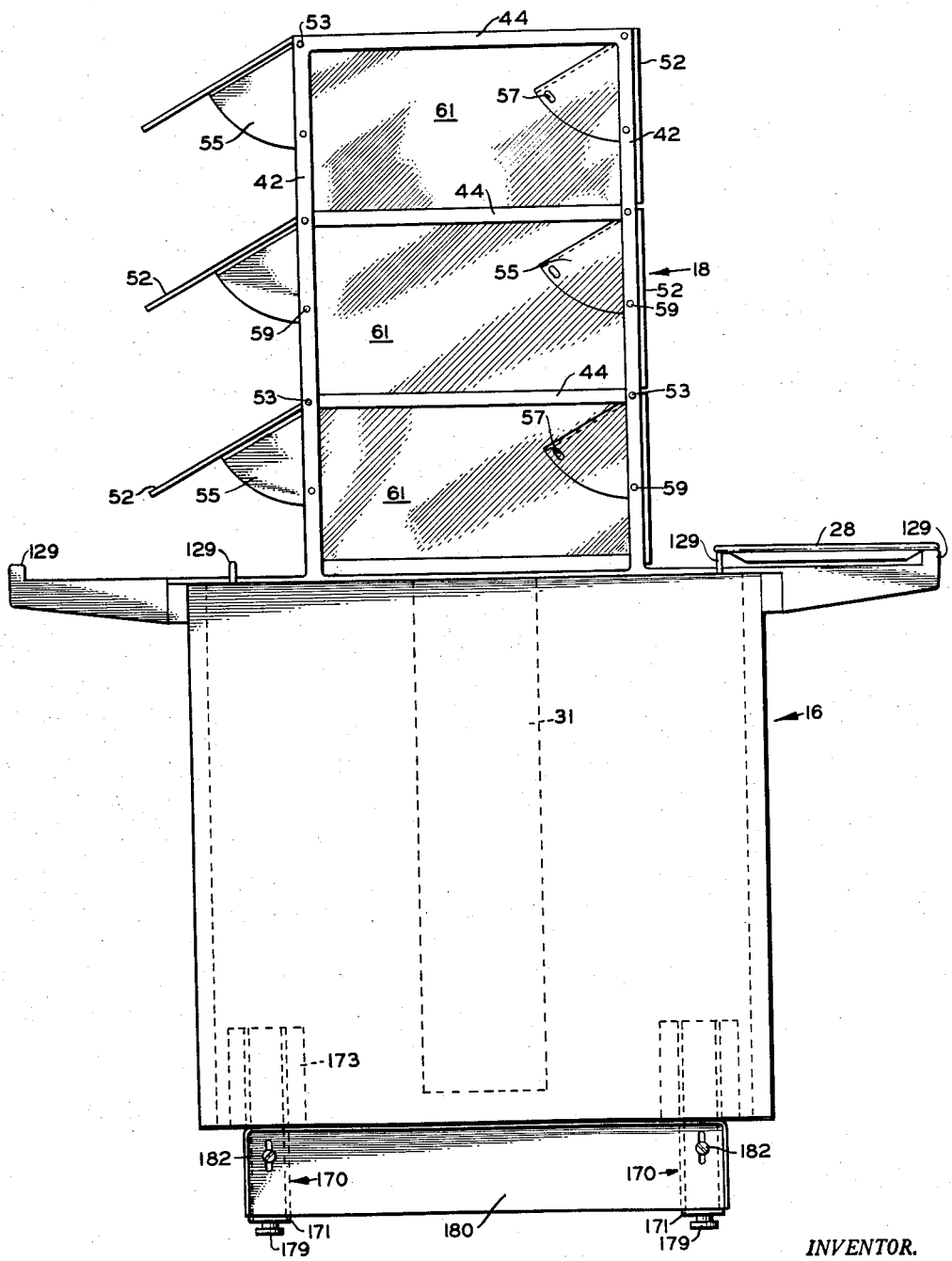
Fig. 2 is an enlarged left end elevation view of same.
Figure 3:
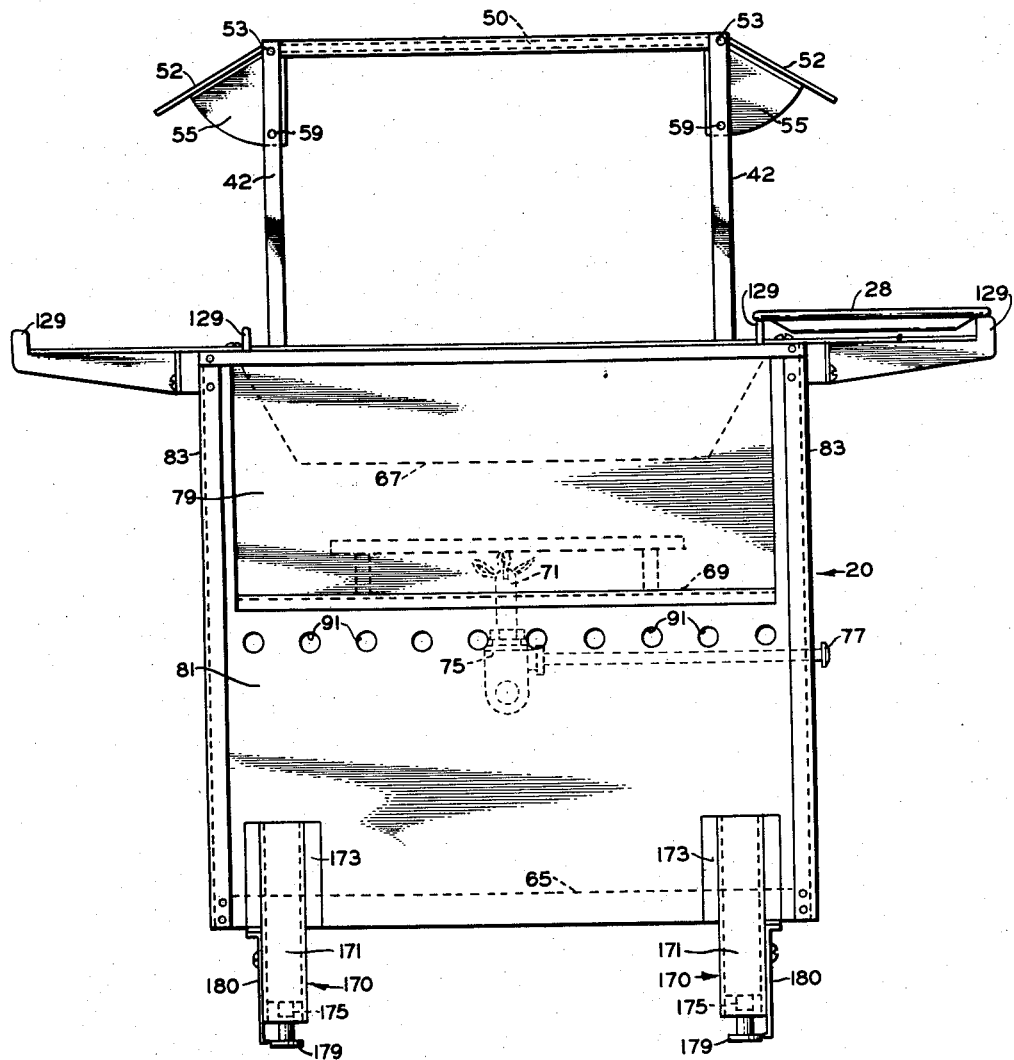
Fig. 3 is an enlarged left end elevation view of the warm food section of same.

The next unit section or station is the refrigerated salad and dessert station 18, and while the unit sections or stations can be lined up in any manner desired and with as many units or stations as desired, the arrangement depicted in Fig. 1 of the drawings has been found particularly preferable from the standpoint of economy and efficiency of structure and operation. The lower portion of station 18 houses refrigeration means, preferably of a mechanical kind, and which can conveniently be any of the usual well known kind. Grill 36 covers the usual cooling air intake. Insulated refrigerated storage space in the rest of the lower portion is closed by insulated typical refrigerator doors 38. A shallow pan 40 in the top of station 18 is preferably used to hold cracked ice on which chilled desserts and salads can conveniently be kept. Station 18 has shelf superstructure mounted on the top thereof. Upright frame members 42, transverse frame members 44 and horizontal frame members 46 mount and support shelves 48, top 50, and sneeze guard members 52. The frame members are preferably made of metal, such as stainless steel, aluminum alloys, etc., and can be any shape and design desired, and shelves 48 and top 50 are preferably made of glass or transparent plastic. The sneeze guards 52 can be fixed in the position shown in Fig. 1 and those on the left side in Fig. 2, or as shown in the drawings they can be hinged by pin means 53 mounted in upright frame members 42 and made to be positionable in either open or closed position. In this specific embodiment, the preferably glass sneeze guard members 52 have metal, or other suitable material, end bracket members 55 which have slots 57 therein. In open position these slots coincide with pins 59 in upright frame members 42, and with the pins 59 in slots 57 the sneeze guard members are locked in open position. The end brackets 55 spring in and out upon exertion of hand pressure to disengage and engage pins 59 in slots 57. As shown in Fig. 2, the right end of the shelf superstructure of station 18 (as viewed in Fig. 1) has a preferably glass partition mounted in the framework 42 and 44. This keeps steam and heat away from the desserts and salads displayed on the shelves, such steam and heat being given off from warm food station or section 20, which is preferably the next station in line to salad and dessert station 18. Tableware bin 63, preferably with four compartments for knives, forks, teaspoons, and soup spoons, is mounted in the top of station 18 in the end portion next to station 16. This bin 63 can just as conveniently be built into the top of station 16, if desired.

The next station or section of the preferred self-service restaurant equipment is the food warmer or warm food station 20. In its lower portion it is preferably provided with a shelf or bottom 65 and room for storage as desired. Supported in the top of station 20 are a plurality, preferably four, of relatively shallow pans 67 which display and hold prepared warm foods for the selection of patron diners. These pans are preferably removable so that they can easily be replaced with full ones when empty and so that they can be removed for cleaning. It has been found desirable to use one of the pans 67 for hot breads and/or rolls, still leaving space for three warm foods from which the diners may make their selection. Warm food station 20 has a glass top 50 spaced from pans 67 and sneeze guards 52 on both sides thereof which work in the same manner as those on station 18 described hereinbefore. These sneeze guard structures of my invention are very important, since their development and use provided for the combination self-service equipment of my invention to be possible, that is, so that it is sanitary and so that it meets with municipal health and pure food regulations. Station 20 is provided with means to keep the food in pans 67 warm. A center shelf 69 mounts and supports usual burner assemblies 71 which are supplied natural gas through lines 73. Valves 75 and knobbed operators 77 on the outside of cabinet station 20 make it possible to regulate the amount of gas to the burners and thus the temperature within station 20 and under pans 67. The position of the burners is desirably such that hot zones exist near the ends of station 20 and a warm zone exists between the burners. The outer pans can then, if desired, be kept warmer than the inner pans. The upper portion of station 20 has panels 79 mounted on end panel members 81, and therebetween is heat insulation 83. Likewise, the sides of station 20 in its upper portion have spaced panels consisting of outer member 85 and inner member 87 between which is more insulation 83. End members 81 in their lower portions below burners 71 have holes 91 through which air is supplied to burners 71 from between stations 18 and 20 and 20 and 22. The path of air flow is shown on Fig. 4. This is desirable whether or not the lower portion of station 20 is closed by sliding doors 93 on wheel mountings 95, or is open as shown in Fig. 1.

The next station 22 and the one preferably adjacent station 20 is the pastry station, used to display pastries, bread, etc. on the shelf superstructure which is desirably the same as that on station 18, as so indicated by the same numeral designation. And, this station also desirably has partitioning means like glass panels 61 on the end next to warm food station 20. The resulting partition protects the food displayed on this station from steam and heat from the warm food station. In the lower portion of station 22 is provided storage for pastries, etc., by bottom or shelf 96, divider 98 and middle short shelf 100. Of course, as in case of all the stations the lower structure can be as desired in regard to being open or closed by either sliding or hinged doors, and the shelf arrangement can be as desired.

Section 24 is the coffee supply station for patrons, and a typical coffee making urn 102 is mounted on the top of the station. Cups and saucers (not shown), cream, etc. are conveniently kept on the top of the station on both sides of the coffee urn 102. Sugar can be made available here, or as has been found suitable at the eating tables for the patron diners in the restaurant. The customer serves himself coffee, and in the last section other beverages, as desired, making practically complete self-service with the equipment. The lower portion of this station 24 can most suitably be storage space having middle shelf 104 and bottom or lower shelf 106.

The last station in line where the patron diner stops in his self-service is station 26, the water and checkout station, where he draws his glass of water, buys milk or other cold drink, as desired, and receives his check from the girl seated at the outer end. The top portion 101 of station 26 at the outer end thereof is preferably designed large enough to hold adding type cash register equipment which preferably delivers a customer's check. As desired, the patron diner can pay at this point for desserts and drinks which he has selected, or a separate cashier operation can be maintained at a convenient place in the restaurant. The diner in the preferred operation pays a fixed sum to serve himself everything he desires except dessert and drink, and it has been found that the second helping privileges make the food service system attractive and desirable. Station 26 preferably has a middle shelf 103 and a lower or bottom shelf 105 in its lower portion which is preferably closed by sliding door panels 107. A cracked ice chest 109 mounted in the upper part of the unit on each side of the water dispensing equipment has been found desirable. Double head faucets which have operating handles 111 which are pushed back to operate the valves, one for each side, are operated by the patron diner who obtains his glass preferably from shelf 113 mounted between upright members 115 which are in turn mounted on the top of station 26. Water is delivered to the dispensing faucets 111 by water line 117, and drains 119 remove excess and overflow water.

The units or sections of the self-service cabinet structure are joined together end-to-end as indicated at lines 120, 122, 124, 126, and 128, respectively, reading from left to right on Fig. 1. Of course, any combination of units can be used together, as desired, the ones depicted in the drawings being desirable, and the units can have lower shelf and door structure, and upper superstructure, as desired. The sneeze guard assembly used with warm food section 20 can be employed with stations 16, 24, and 26, if desired, and in many installations such has been found convenient and desirable.

Figure 5:
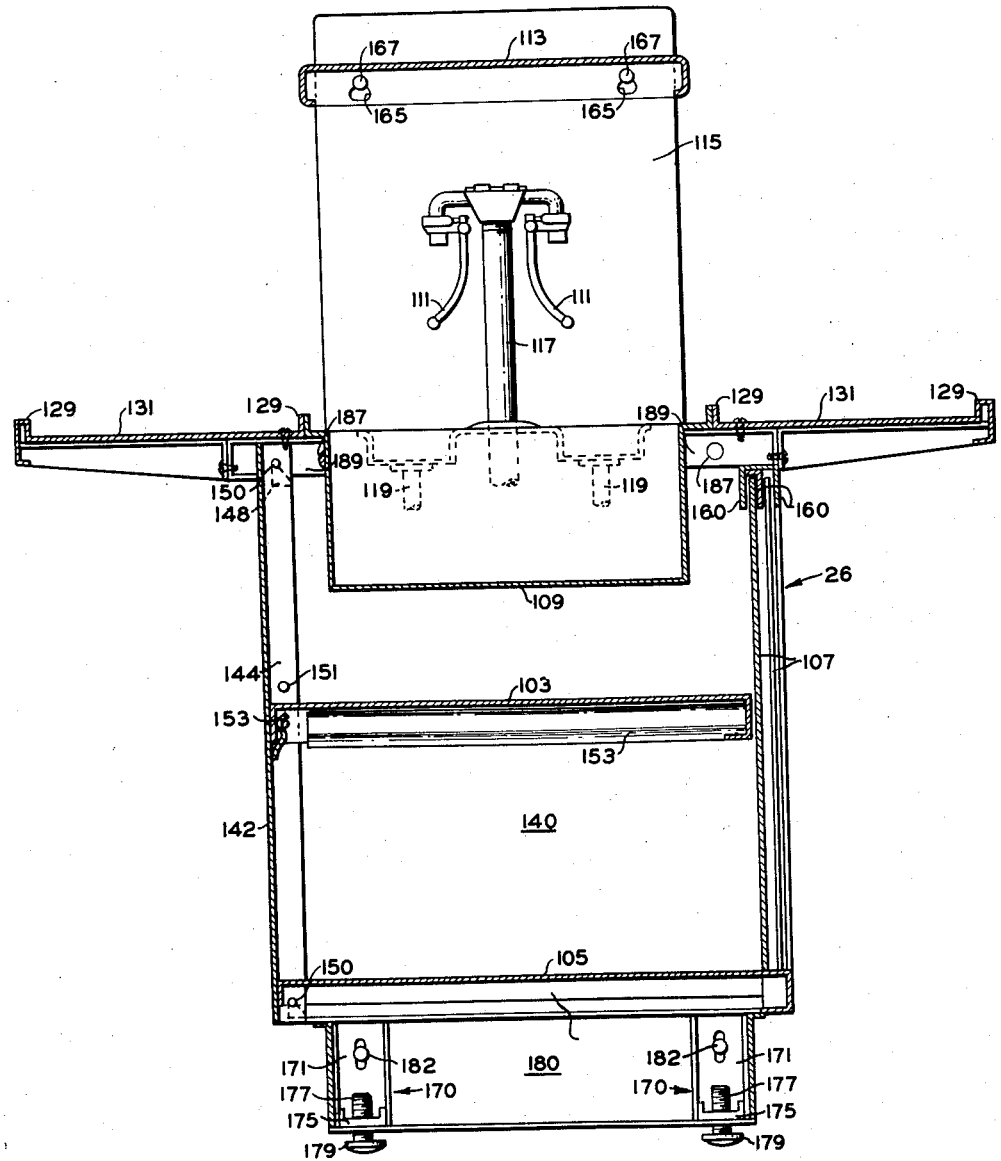
Fig. 5 is an enlarged transverse cross sectional elevation view through the water and checkout station of same taken on line 5—5 of Fig. 1.

Along the upper outer edge of the cabinet structures and overhanging same are mounted the serving tray support means, a set of rails on each side so that two lines of persons may serve themselves, one from each side. Patron diners move their trays along the rails 129 thereof with the lip of the tray 28 overhanging the rails 129. Rails 129 are constructed high enough so that the bottom of tray 28 does not touch the bottom of the rail support means 131. This keeps the tray bottoms clean, so that when stacked the tops of trays are not dirtied. As best shown in Fig. 5, it has been found desirable to construct the tray rail support means out of sheet metal, mounted conveniently on the top and side of the cabinet by the usual sheet metal screws. In a unit as depicted in Fig. 1, the tray support means is preferably made in two sections joined as indicated at 133. It is quite important that the tray rail structure be such that when in use the inner edge of the tray extends out over the pans 67 in warm food station 20. Thus, when a diner is serving himself, any food spilled from a serving spoon, fork, ladle, dipper, spatula, etc., will fall back into the pan or on the diner's tray. This prevents unsightly and unsanitary food drippings, and such structure has been found to make my new self-service cabinet structure very beneficial.

Thus, in using my new equipment, a combination structure such as shown in Fig. 1 is conveniently installed in the restaurant with tables and chairs for diners placed conveniently in relation thereto. In connection herewith my new equipment is particularly desirable because it can be used in almost any size or shape of restaurant, since it is preferably positioned out from the walls where persons can get at it from both sides to result in rapidly serving a maximum number of people. The diners pay a fixed price to serve themselves what they desire. First, they obtain a tray 28, plate, tableware and napkin at the left end of the server (Fig. 1), placing the tray 28 on rails 129 with the other equipment thereon. At station 18 to where the tray is moved along rails 129, the patron takes his salad, olives, green onions, celery, and the like, and selects the chilled dessert he desires. Then at the next station 20, the patron takes what he wishes of the prepared warm foods in pans 67, and perhaps a warm biscuit or roll which can conveniently be displayed in one of the pans. At station 22 in route the patron diner selects his bread as desired, butter which can be conveniently displayed on a tray, and pastry which is displayed in proper plates on the shelves 48 thereof. Coffee and/or milk, tea, etc., and water are picked up at stations 24 and 26, and the cashier adds up the drinks and dessert in addition to the price for the rest of the meal, taking payment therefor, or giving a check which is paid as the diner leaves the restaurant. The diner then carries his tray to the table, booth or counter where he partakes of his meal. Trays and dirty dishes are picked up by bus boys. In this manner the patron furnishes all the labor for his service, and such patron diner is most happy because he can have as large a portion of the particular food he likes as he desires. In operating a restaurant with my new self-serving equipment it is possible to cut labor costs up to one-half of those in a typical restaurant where the customers are personally served from a menu, and food costs can be cut up to fifteen percent or more, principally because the diner does not take foods he doesn't like and in quantities he does not want. However, it should be pointed out that my new self-service structure can be used in conjunction with the typical personal service restaurant, the diner making his decision whether to serve himself for a fixed sum or to be personally served from a menu, and such combination operations have proven very successful.

The new knock-down back bar or cabinet structure of my invention shown in the drawings is preferably used to construct the various stations of my self-service equipment. This knockdown structure can of course be used in other installations to provide cabinets or back bars. The structure detail is best shown in Figs. 6 through 14 with, of course, much of the detail appearing in other figures, particularly Figs. 4 and 5. The basic structure is formed from two end panel members 140, and a side or back panel member 142. The end panel members have a groove formed along one side on the back by a strip 144 attached thereto in any suitable manner such as by welding. The back or side panel member 142 has inwardly projecting tongues 146 on the ends thereof which can preferably be formed by angle members attached thereto in any suitable manner such as by welding. These tongue portions 146 have hook on slots 148 therein in the upper and lower portions, and pin members 150 project transversely through strip members 144 and end panel members 140 with the central portion of the pin member 150 exposed in the groove. In assembling the units the tongue portions 146 are fit into the grooves with rivets 150 entering the slots 148 in portion 146. The side or back panels fall into place in relation to each other with the pins 150 in engagement in slots 148. A locking pin 151 is mounted through corresponding holes in strip 144 and end panel 140, such keeping the end and side or back panels from moving vertically in relation to one another.

End panel members 140 and side or back panel members 142 have central shelf bracket strips 153 (provided a middle shelf is desired) and lower shelf bracket strips 155 attached thereto in any suitable manner such as by welding. These shelf brackets form grooves with the panel members to mount the shelves, namely, middle shelves 69, 100, 103, and 104 of the cabinet structures and lower shelves 30, 65, 96, 105, and 106 of these cabinet structures. The lower shelf bracket strip 155 preferably has a lower stiffening angle portion 157 to give rigidity to the structure. The shelves have a depending lip portion with a dimple 159. This lip portion fits into the groove formed by the shelf bracket and the cabinet panels, snapping into place to hold the ends and back or side together rigidly. This basic structure results in a firm rigid set-up unit from individual panels and shelves which can be knocked down to a very compact bundle of members for shipping, storing, etc. A principal advantageous feature is that a minimum number of parts and tools are needed to erect the structure and any type of top and front or side can be mounted thereon, for example (as shown) sliding doors 107 in guides 160 (Figs. 1 and 5), or one side can be open as shown in the drawings.

Fig. 5 and Figs. 11, 12, and 13 show preferred wedge type key hole fastener means to mount shelf 113 between and on uprights 115. This type of fastening and mounting means can conveniently be used to mount other equipment on the acbinet structure, for example tray supports 131 instead of the sheet metal screw mounting shown, or such as work boards (not shown), etc. Key hole 165 receives key 167 which is mounted in upright panel 115, the shank of the key fitting into the smaller portion of the key hole aperture to hold members 113 and 115 in rigid, close relation.

I prefer to mount my new cabinet or back bar units on legs 170 which are adjustable as to height. These legs are mounted on the end panels on each end thereof, and when the units are erected the legs are out of sight. The leg bracket members 171 are attached to end panels 140 in the end portions thereof in any suitable manner, such as by welding the flange portions 173 to panels 140. A preferably U-shaped foot support member 175 is mounted in the bottom of the leg bracket in any suitable manner, such as by welding it thereto. This mounting member 175 is tapped and threaded in its central portion and mounts the threaded leg 177 of foot 179 so that the legs can be adjusted as to heighth individually, resulting in a unit which rests on the floor on all legs regardless of the unevenness of the floor on which it sits.

The leg brackets and assembly therewith are set back from the sides of the back bar or cabinet structure to provide toe space, and the legs brackets 171 serve another purpose besides mounting the adjustable feet 179, that is, kick plates 180 are attached to leg brackets 171. These plates 180 preferably have vertical slots therein through which pass the bolt holding means 182 that holds the plates on brackets 171. In this manner the kick plates 180 can be adjusted to the desired and proper height.

For joining the knock-down back bar or cabinet unit structures together, I preferably form channel portions 185 on each end of the end panel members 140, and as shown in Figs. 6 and 14 bolt means 187 is passed through adjacent channel portions to hold the sections or stations together. Angle members 189 (Figs. 5 and 6) are attached to the top of the end panel members 140, preferably by bolt means 187 which holds the units together. A unique means is employed to position the units in proper relation to one another and to provide for the top surface of the units to be even at the points of joining. A dowel 190 fitting through coinciding holes in adjacent end panel channel portions places the units in proper vertical relationship. A loose tongue member 192 fits between the top surface members of the units, for example top 194 of station 18 and top 196 of station 20, and angle members 189. This tongue 192 backs up the top members giving them support.

The end sections or stations of a combination unit such as shown in Fig. 1 have slip on end panel members 200. See Figs. 1 and 7. These panel members have grooved end portions formed by attaching a strip 202 thereto along the outer end portion. The panels are mounted on the ends using the outer inwardly projecting portion of channel portion 185 as the tongue which fits into the end grooves.

The cabinet or back bar structure of my invention is particularly desirable because it knocks down into relatively flat members which are easy to pack in a small space. Assembly is easy and requires only the most simple of tools. The end, side or back, and shelf panel members interlock to brace and hold each other, and the top and front, as desired, mount simply.

As will be evident to those skilled in the art, various modifications of this invention can be made, or followed, in the light of this disclosure and discussion, without departing from the spirit or scope of the disclosure or from the scope of the claims.

I claim:

1. Restaurant equipment for self-serving persons comprising, an elongated cabinet structure having a generally horizontal top and generally vertical sides, generally horizontal pans mounted upon the cabinet structure adjacent to its top and extending throughout substantially the entire width of the cabinet structure and having two oppositely disposed edges terminating close to said sides of the cabinet structure, said pans having their tops open and adapted for receiving foods to be served by the persons, generally horizontal tray guiding devices extending longitudinally of the cabinet structure and arranged upon opposite sides of the cabinet structure adjacent to its top, each tray guiding device comprising an imperforate plate and a pair of upstanding rails leading to the plate, the inner and outer rails of each tray guiding device being transversely spaced and extending above said plate for a substantial distance, each inner rail being arranged above and disposed inwardly of the open tops of said trays, and serving trays slidably mounted upon the rails, each serving tray including a body portion and side flanges adjacent to the top of the body portion, the body portion extending below the side flanges, the side flanges being mounted upon said rails and the body portion being held by the flanges spaced from and out of contact with said plate, one side flange of each tray being disposed above and in overlapping relation with one of the aforementioned oppositely disposed edges of the pan, the arrangement being such that when food is spilled in transferring the same from the pan to the serving tray such food will be caught within the pan.

2. Restaurant equipment for self-serving persons comprising, an elongated cabinet structure having a generally horizontal top and generally vertical sides, generally horizontal pans mounted upon the cabinet structure adjacent to its top and extending throughout substantially the entire width of the cabinet structure and having two oppositely disposed edges terminating close to said sides of the cabinet structure, said pans having their tops open and adapted for receiving food to be served by the persons, a generally horizontal tray guiding device extending longitudinally of the cabinet structure and arranged upon one side of the cabinet structure adjacent to its top, each tray guiding device comprising an imperforate plate and a pair of upstanding rails extending above the plate, the inner rail being arranged above and disposed inwardly of the open tops of said pans, and serving trays slidably mounted upon the rails, each serving tray including a body portion and side flanges adjacent to the top of the body portion, the body portion extending below said flanges, the side flanges being mounted upon said rails and the body portion being held by the flanges spaced from and out of contact with said plate, one side flange being disposed above and in overlapping relation with one of the aforementioned oppositely disposed edges of said pan, the arrangement being such that when food is spilled in transferring the same from the pan to the serving tray such food will be caught by the pan.

3. Restaurant equipment for self-serving persons comprising an elongated cabinet structure having a generally horizontal top, a plurality of pans receivable by the horizontal top and having opposite edges terminating close to the sides of the horizontal top, tray guiding means extending longitudinally of the cabinet structure upon opposite sides thereof adjacent the horizontal top, serving trays slidably receivable on the tray guiding means, each serving tray including side flanges, the flange on the side of the tray adjacent the horizontal top extending over the pans in the horizontal top whereby food spilled in transferring same from the pan to the tray will fall into the pan or tray and not on the tray guiding means.

4. Restaurant equipment for self-serving persons comprising an elongated cabinet structure having a generally horizontal top, a plurality of pans receivable by the horizontal top and having opposite edges terminating close to the sides of the horizontal top, tray guiding means extending longitudinally of the cabinet structure on opposite sides thereof adjacent the horizontal top, said tray guiding means including spaced longitudinal upstanding flanges and a floor portion between said flanges, serving trays slidably receivable on the tray guiding means, each serving tray including side flanges, said side flanges resting on the upstanding flanges, and maintaining the bottom of the tray clear of the floor portion of the tray guiding means, the upstanding flange adjacent the pans being elevated in respect thereto, the horizontal flange on the side of the tray adjacent the horizontal top extending over the pans in the horizontal top whereby food spilled in transferring same from the pan to the tray will fall into the pan or tray and not on the tray guiding means.

References Cited in the file of this patent

UNITED STATES PATENTS

| | | |
|---|---|---|
| 1,388,975 | Spink et al. | Aug. 30, 1921 |
| 1,516,404 | Palmenberg | Nov. 18, 1924 |
| 1,705,112 | Hall | Mar. 12, 1929 |
| 2,279,945 | Hoffman | Apr. 14, 1942 |
| 2,576,409 | Michaelis | Nov. 27, 1951 |
| 2,625,242 | Reed | Jan. 13, 1953 |

OTHER REFERENCES

Institutions Magazine, vol. 28, No. 5, May 1951 (page 101, advertisement of Leitner Equipment Co.).